(12) United States Patent
Li et al.

(10) Patent No.: US 8,070,683 B2
(45) Date of Patent: Dec. 6, 2011

(54) SCAN CONVERSION FOR ULTRASONIC IMAGING AND APPARATUS USING THE SAME

(75) Inventors: Yong Li, Shenzhen (CN); Bin Yao, Shenzhen (CN)

(73) Assignee: Shenzhen Mindray Bio-Medical Electronics Co., Ltd., Shenzhen (CN)

( * ) Notice: Subject to any disclaimer, the term of this patent is extended or adjusted under 35 U.S.C. 154(b) by 1011 days.

(21) Appl. No.: 11/967,874

(22) Filed: Dec. 31, 2007

(65) Prior Publication Data

US 2009/0062649 A1 Mar. 5, 2009

(30) Foreign Application Priority Data

Sep. 4, 2007 (CN) .................. 2007 1 0153666

(51) Int. Cl.
*A61B 8/14* (2006.01)
*G06K 9/00* (2006.01)
(52) U.S. Cl. ....................... 600/443; 382/131
(58) Field of Classification Search .......... 600/443, 600/437, 459; 382/128, 130–132, 300
See application file for complete search history.

(56) References Cited

U.S. PATENT DOCUMENTS

| | | | |
|---|---|---|---|
| 5,513,120 A | 4/1996 | Berlad | |
| 6,192,164 B1 | 2/2001 | Park | |
| 6,248,073 B1* | 6/2001 | Gilbert et al. | 600/447 |
| 7,803,114 B2* | 9/2010 | Miyaki | 600/447 |
| 2007/0239019 A1* | 10/2007 | Richard et al. | 600/459 |

FOREIGN PATENT DOCUMENTS

| | | |
|---|---|---|
| JP | 10179583 | 7/1998 |
| JP | 2002306479 A | 10/2002 |
| JP | 2005058587 A | 3/2005 |

* cited by examiner

*Primary Examiner* — Irakli Kiknadze
(74) *Attorney, Agent, or Firm* — Kory D. Christensen; Stoel Rives LLP

(57) ABSTRACT

A scan conversion method for ultrasonic imaging is disclosed. The method comprises a storage step for storing sample data derived from ultrasonic echo signals into a memory; a conversion step for performing conversion between target coordinate points in a display coordinate system and interpolation coordinate points in a sampling coordinate system; and an interpolation step for interpolating several sample data adjacent to the interpolation coordinate points to obtain the interpolation data at the interpolation coordinate points, wherein the interpolation step includes a nonlinear interpolation substep selected for low-pass filter of the ultrasonic echo signals. When interpolation is conducted along Axis θ of the polar coordinates, 4-point interpolation may be used. The interpolation coefficient may be based on cubic B-spline function, which has relatively uniform low-pass filter effects, thereby reducing noise result from interpolation in ultrasonic image.

12 Claims, 4 Drawing Sheets

US 8,070,683 B2

SCAN CONVERSION FOR ULTRASONIC IMAGING AND APPARATUS USING THE SAME

RELATED APPLICATIONS

This application claims priority to Chinese Patent Application No. 200710153666.0, filed Sep. 4, 2007, the disclosure of which is incorporated herein by reference in its entirety.

TECHNICAL FIELD

The present disclosure relates to a scan conversion method for ultrasonic imaging.

SUMMARY

An interpolation method for digital scan conversion in ultrasonic imaging is disclosed. Also disclosed is an apparatus for using the interpolation method.

DETAILED DESCRIPTION OF PREFERRED EMBODIMENTS

An ultrasonic imaging diagnostic apparatus in medical use typically utilizes ultrasonic propagation in a human body to obtain information on ultrasonic features of tissues and organ structures in the human body. Current ultrasonic diagnostic systems generally use probes with multiple array elements. In such systems, pulse waves at high pressure are loaded onto each array element to activate the array elements to produce high-frequency ultrasonic waves, which further form emission wave beams and enter the human body. Meanwhile, each array element receives an echo scattered or reflected from the tissues inside the human body to form received wave beams. The ultrasonic diagnostic system then extracts information from the ultrasonic echo to form images in several display modes. During clinical examination, the information is displayed in real time on a cathode ray tube (CRT) display or a liquid crystal display (LCD).

Several techniques for imaging in real time (e.g., under B-mode and C-mode) require scan conversion, i.e., converting information contained in the ultrasonic echo signals for display on CRT or LCD. Currently, most medical ultrasonic equipment employs digital scan converters (DSCs) for scan conversion. A DSC is a typically a memory. The format of data written into the memory is in accordance with that of information contained in the received ultrasonic echo signals, and the reading format is in accordance with that of display on the CRT or LCD (e.g., standard television grid mode).

Figure 1:
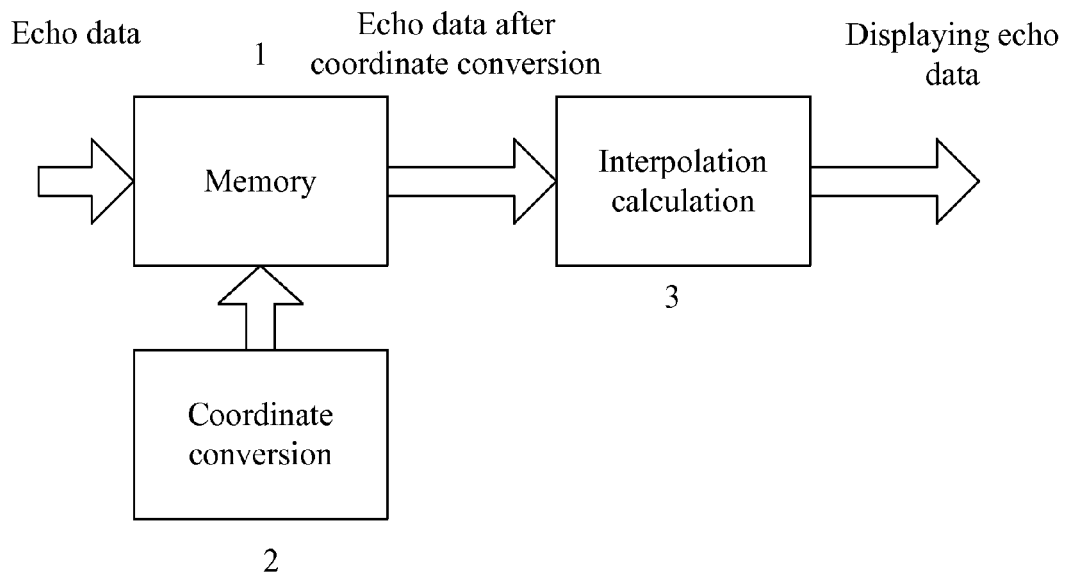
FIG. 1 is a schematic diagram of a digital scan conversion system.

FIG. 1 is a schematic diagram of a digital scan conversion system. As shown in the Figure, a DSC consists of a storage unit 1, a coordinate conversion module 2, and an interpolation module 3. The storage unit 1 is a memory for storing ultrasonic echo data. The coordinate conversion module 2 converts coordinates on the CRT or LCD screen into those corresponding to information contained in ultrasonic echo signals. The data contained in ultrasonic echo signals is obtained through scan wave beams, which in examination generally center around the probe and reciprocally move within a range of an angle on the examined section of the human body. Thus ultrasonic information obtained from the examined section is usually presented in polar coordinates. However, for the display pixels on a standard television grid display system, Cartesian coordinates are usually applied. Therefore, conversion is required between the polar coordinates and Cartesian coordinates. The interpolation module 3 calculates the information contained in the ultrasonic echo under the Cartesian coordinate system through an interpolation algorithm. Generally, only a few pixel points on the Cartesian coordinates can correspond to points on the polar coordinates one by one, while most displayed pixel points are obtained using interpolation adjacent to the polar coordinate points. To reduce aliasing noise caused by the positional difference between the display points on Cartesian coordinates and the sampling points on polar coordinates, the number of display points needs to increase on the display. However, as a common standard display presents limited display points, for example, 640×480 or 1024×768, various forms of noise resulting from digital scan conversion often appear on the images finally displayed during coordinate conversion.

A typical interpolation algorithm used in current ultrasonic imaging systems is directed to linear interpolation between four adjacent points (R-θ interpolation), which requires few calculations and is easily carried out. Noise resulting from digital scan conversion under B-mode and the relative solution are described in the article "Analysis of a Scan Conversion Algorithm for a Real-Time Sector Scanner," IEEE Transactions on Medical Imaging, vol. MI-5, No. 2, June 1986, M. H. Lee et al.

Figure 2:
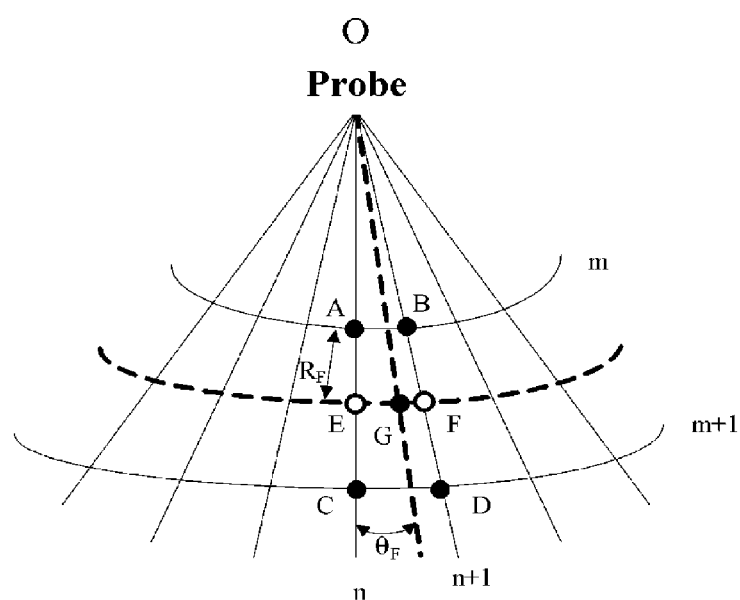
FIG. 2 is a schematic diagram illustrating linear interpolation between four adjacent points.

As shown in FIG. 2, the algorithm via interpolation between adjacent points relates to estimation by interpolation using the ultrasonic wave information of four sampling points in the polar coordinates along the neighboring depth of two adjacent scanning lines when the ultrasonic wave information corresponding to the coordinates of a certain display point under the Cartesian coordinate system is calculated. Specifically, the steps are elaborated as follows. First, it is supposed that the intersection angle between two adjacent scanning lines is normalized as 1, and the distance between two points in an adjacent point depth is normalized as 1. After coordinate conversion of Point G displayed in the Cartesian coordinate system on a CRT or LCD screen, four corresponding adjacent points in echo data, indicated as A, B, C, and D, can be found. The scan depth of points A and B is the same, and so is that of points C and D. Points A and C are located in the same scanning line n, and points B and D are located in the same scanning line n+1. The ultrasonic echo information corresponding to the four points can be assumed as $X_A$, $X_B$, $X_C$, and $X_D$, respectively.

Second, it is supposed that the normalized intersection angle between the polar coordinates corresponding to Point G and scanning line n is $\theta_F$ (the intersection angle between the scanning lines n and n+1 is 1), and then the normalized intersection angle between the polar coordinates corresponding to Point G and the scanning line n+1 is 1−$\theta_F$. Third, it is supposed that the normalized distance in the radial direction between the polar coordinates corresponding to Point G and Point A is $R_F$ (the radial distance between Points A and C indicated as 1), and then the normalized distance in the radial direction between the polar coordinates corresponding to Point G and Point C is 1−$R_F$. Then the algorithm via interpolation between adjacent points performs an interpolation operation by taking the normalized intersection angle and the normalized distance as weight. First, information $X_E$ contained in Point E is obtained by interpolation as a function of the ultrasonic wave information of Points A and B.

$$X_E = X_A*(1-R_F) + X_C*R_F.$$

Then information $X_F$ in Point F is obtained by interpolation as a function of the ultrasonic wave information of Points C and D.

$$X_F = X_B*(1-R_F) + X_D*R_F.$$

Finally, information $X_G$ in Point G is obtained by interpolation as a function of the ultrasonic wave information of Points E and F.

$$X_G = X_E*(1-\theta_F) + X_F*\theta_F.$$

In U.S. Pat. No. 5,513,120, entitled "Special Interpolation Filters," Gideon Berlad describes a method of interpolation and filter based on guaranteed variance, which is used for medical diagnostic imaging, such as X-ray emission imaging, nuclear medical imaging, nuclear magnetic resonance imaging, and ultrasonic imaging. In this method, interpolation is considered to always convert the source image, and such conversion might produce low-pass filter (smooth) or high-pass filter (sharpening) effects with regard to different interpolations. Summation of square roots of interpolation coefficients (corresponding to variance) could be greatly affected by positions, and effects of a low-pass filter or high-pass filter may be distinct due to different positions on the image. This interpolation method is for designing the filter coefficient based on constant variance, neither a low-pass filter nor a high-pass one.

The commonly used method via linear interpolation between four adjacent points easily results in texture noise in the ultrasonic imaging systems, and the frequency spectrum of the image is changed after interpolation. Linear interpolation between adjacent points on the ultrasonic source image is equivalent to a low-pass filter (smooth), but the effect of such low-pass filtering is not good. Linear interpolation between adjacent points on the ultrasonic image is equivalent to convolution between the ultrasonic image and a predetermined trigonometric function. Nevertheless, as the attenuation frequency is quite close to the cutoff frequency in the frequency spectrum of the trigonometric function, linear interpolation would smooth images, but simultaneously abundance energy higher than the cutoff frequency would pass. In this instance, linear interpolation may induce that signals beyond the cutoff frequency pass through the interpolation filtering function and alias with the portion at low frequency, and then texture noise on the images would be produced.

The interpolation method described in the U.S. Pat. No. 5,513,120, entitled "Special Interpolation filters," is primarily used in medical imaging, such as X-ray emission imaging, nuclear medical imaging, nuclear magnetic resonance imaging, and ultrasonic imaging. Nonetheless, the method does not take the features of ultrasonic imaging per se into account, i.e., the influence of coordinate conversion on the interpolation method. Due to the manner of examination, the ultrasonic information obtained on the examined section in the ultrasonic imaging system is usually presented in polar coordinates. Thus the ultrasonic source image is also presented in polar coordinates. However, the display pixels on the display system are typically shown in Cartesian coordinates. Therefore, in the near field of the probe, data sampling points in the image are relatively dense and oversampling occurs, while in the far field of the probe, the contrary is the case and undersampling occurs. Besides, in the direction of Axis R of the polar coordinates, the image sampling ratio in the source image is relatively high with dense data sampling points, while in the direction of Axis θ of the polar coordinates, the contrary is the case. Therefore, direct application of said interpolation method to ultrasonic imaging may result in too much noise.

To reduce noise in ultrasonic imaging caused by interpolation, a new scan conversion method for ultrasonic imaging and an apparatus using the method is disclosed. According to one aspect of the disclosure, a scan conversion method for ultrasonic imaging is provided, comprising a storage step, for storing sample data derived from ultrasonic echo signals into a memory; a conversion step, for performing conversion between the target coordinate points in a display coordinate system and the interpolation coordinate points in a sampling coordinate system; and an interpolation step, for interpolating several sample data adjacent to the interpolation coordinate points to arrive at the interpolation data of the interpolation coordinate points, wherein the interpolation step includes a nonlinear interpolation substep, which realizes low-pass filter of the ultrasonic echo signals. To be noted, the sequence of the steps described above is subject to different situations. For example, the conversion step may follow the interpolation step.

In one embodiment, the display coordinate system is a Cartesian coordinate system, the sampling coordinate system is a polar coordinate system, and the conversion step includes conversion of a coordinate point (x, y) to be displayed in the Cartesian coordinate system into an interpolation coordinate point (R, θ) in the polar coordinate system, and disintegration of the interpolation coordinate point (R, θ) into an integer part ($R_I$, $\theta_I$) and a fraction part ($R_F$, $\theta_F$) according to sampling density.

Further, the sample data adjacent to the interpolation coordinate point (R, θ) contain eight sample data points obtained through a look-up table or calculation as a function of the integer part ($R_I$, $\theta_I$), and are divided into four groups, in each of which two sampling points are located in the same radial coordinate axis (R) of the polar coordinate system.

Next, the interpolation step further includes a linear interpolation substep, which respectively executes 2-point linear interpolation with the two sampling points in each group along the radial coordinate axis as a function of the fraction part $R_F$, thereby obtaining four intermediate interpolation signal data.

Still further, the nonlinear interpolation substep executes 4-point spline interpolation with the four intermediate interpolation signal data as a function of the fraction part $\theta_F$ to obtain the interpolation signal data corresponding to the interpolation coordinate point (R, θ), wherein the interpolation coefficient of the 4-point spline interpolation is acquired by looking up the interpolation coefficient corresponding to $\theta_F$ in an interpolation coefficient table or by real-time calculation through cubic B-spline function, and the interpolation coefficients and cubic B-spline function carry out low-pass filter of the ultrasonic echo signals.

According to another aspect of the disclosure, a scan conversion method for ultrasonic imaging is provided, which conducts coordinate conversion and interpolation with sample data derived from ultrasonic echo signals to form interpolation signal data to be displayed in the Cartesian coordinate system, includes converting a point (x, y) to be displayed in the Cartesian coordinate system into an interpolation point (R, θ) in the polar coordinate system, and then disintegrating the interpolation point (R, θ) into an integer part ($R_I$, $θ_I$) and a fraction part ($R_F$, $θ_F$) as a function of scan line density. The method also includes obtaining eight sampling points proximal to the interpolation point (R, θ) through a look-up table or calculation as a function of the integer part ($R_I$, $θ_I$), wherein said eight sampling points fall into four groups, in each of which two sampling points are located in the same scanning line. The method further includes conducting two-point linear interpolation with the eight sampling points along Axis R of the polar coordinates as a function of the fraction part $R_F$, thereby obtaining intermediate interpolation signal data of the four points. The method includes conducting 4-point spline interpolation with the intermediate interpolation signal data of the four points as a function of the fraction part $θ_F$ to obtain the interpolation signal data corresponding to the interpolation point (R, θ), wherein the interpolation coefficient of the 4-point spline interpolation is obtained by looking up the interpolation coefficient corresponding to $θ_F$ in an interpolation coefficient table or by real-time calculation through cubic B-spline function.

In one embodiment, the interpolation coefficient table is prepared by precalculation through a cubic B-spline function. The cubic B-spline function is:

$$f(θ_F)=(a+2)θ_F^3-(a+3)θ_F^2+1\ 0<θ_F<1$$

$$f(1+θ_F)=a(1+θ_F)^3-5a(1+θ_F)^2+8a(1+θ_F)-4a\ 1<1+θ_F<2$$

wherein the four interpolation coefficients to be calculated by the 4-point spline interpolation are $f(θ_F)$, $f(1+θ_F)$, $f(1-θ_F)$, and $f(2-θ_F)$, wherein, $0<θ_F<1$.

According to still another aspect of the disclosure, a scan conversion apparatus for ultrasonic imaging is provided, which comprises a storage module for storing sample data derived from ultrasonic echo signals; a coordinate conversion module for performing conversion between target coordinate points in a display coordinate system and interpolation coordinate points in a sampling coordinate system; and an interpolation module for interpolating several sample data adjacent to the interpolation coordinate points to acquire the interpolation data at the interpolation coordinate points, wherein the interpolation module includes a nonlinear interpolation submodule, which is selected for low-pass filter of the ultrasonic echo signals.

According to still another aspect of the disclosure, a scan conversion apparatus for ultrasonic imaging is provided, which is used to perform coordinate conversion and interpolation with sample data derived from ultrasonic echo signals to form interpolation signal data to be displayed in the Cartesian coordinate system. In one embodiment, the apparatus includes a coordinate conversion module for converting a point (x, y) to be displayed in the Cartesian coordinate system into an interpolation point (R, θ) in the polar coordinate system, and disintegrating the interpolation point (R, θ) into an integer part ($R_I$, $θ_I$) and a fraction part ($R_F$, $θ_F$) as a function of scan line density. The apparatus also includes a linear interpolation module for obtaining eight sampling points proximal to the interpolation point (R, θ) through a look-up table or calculation as a function of the integer part ($R_I$, $θ_I$), wherein the eight sampling points are classified into four groups, in each of which two sampling points are located in the same scanning line, and performing 2-point interpolation with the eight sampling points grouped along Axis R of the polar coordinates as a function of the fraction part $R_F$, thereby achieving intermediate interpolation signal data of the four points.

In one embodiment, the apparatus further includes a nonlinear interpolation module for 4-point spline interpolation with the intermediate interpolation signal data of the four points as a function of the fraction part ($θ_F$) to obtain the interpolation signal data corresponding to the interpolation point (R, θ), wherein the interpolation coefficient of the 4-point spline interpolation is obtained by looking up the interpolation coefficient corresponding to ($θ_F$) in an interpolation coefficient table or by real-time calculation through cubic B-spline function.

The disclosed algorithm is an improvement over the interpolation algorithm used in DSC processing in ultrasonic imaging systems. During interpolation in ultrasonic images, in view of the features of converting a source image in polar coordinates into a displayed image in Cartesian coordinates, a new interpolation method is applied, and the final display of ultrasonic information needs interpolating. Along Axis θ of the polar coordinates (i.e., the polar coordinate axis), the sampling ratio of ultrasonic source images is relatively low and uneven. Besides, oversampling in the image readily occurs near the probe zone. However, remote from the probe zone, the contrary is the case. When interpolation is performed along Axis θ of the polar coordinates, a 4-point interpolation method is utilized in one embodiment. The interpolation coefficient algorithm may be according to a cubic B-spline function, which shows relatively even low-pass filter characteristics in space and the same low-pass filter effects corresponding to the interpolation coefficients along Axis θ of the polar coordinates, leading to weakened noise in ultrasonic images caused by interpolation.

Figure 3:
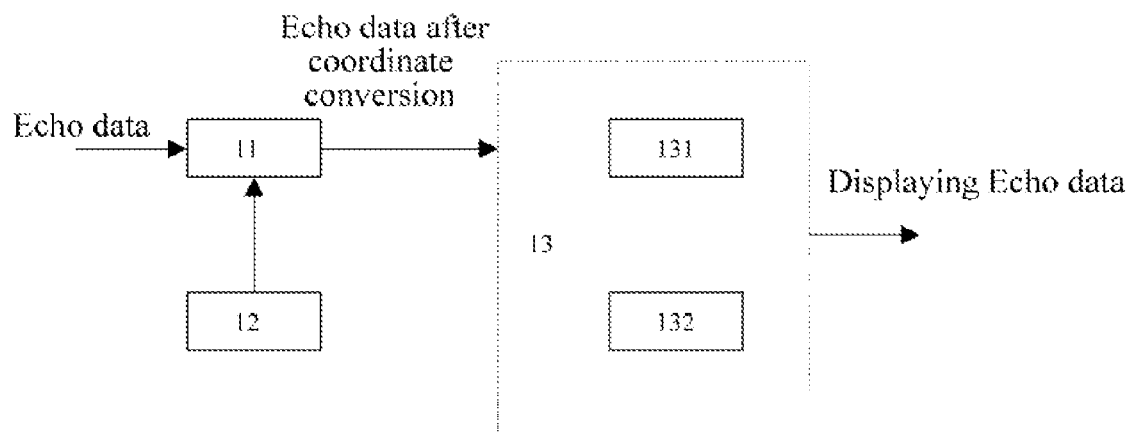
FIG. 3 is a flow diagram of a scan conversion method according to one embodiment of the disclosure.

FIG. 3 is a flow diagram of a scan conversion method according to one embodiment of the disclosure, comprising: a storage step 11, for storing sample data derived from ultrasonic echo signals into memory; a coordinate conversion step 12, for conducting conversion between target coordinate points in a display coordinate system and interpolation coordinate points in a sampling coordinate system; and an interpolation step 13, for interpolating sample data of several adjacent interpolation coordinate points to obtain the interpolation data at the interpolation coordinate points, wherein the interpolation step 13 includes a linear interpolation substep 131 and a nonlinear interpolation substep 132, and the nonlinear interpolation substep 132 achieves low-pass filtering of the ultrasonic echo signals. Finally, the ultrasonic information calculated by spline interpolation is displayed on the CRT or LCD screen. Hereinafter, a structural diagram of a scan conversion apparatus according to the present disclosure is incorporated for particulars.

Figure 4:
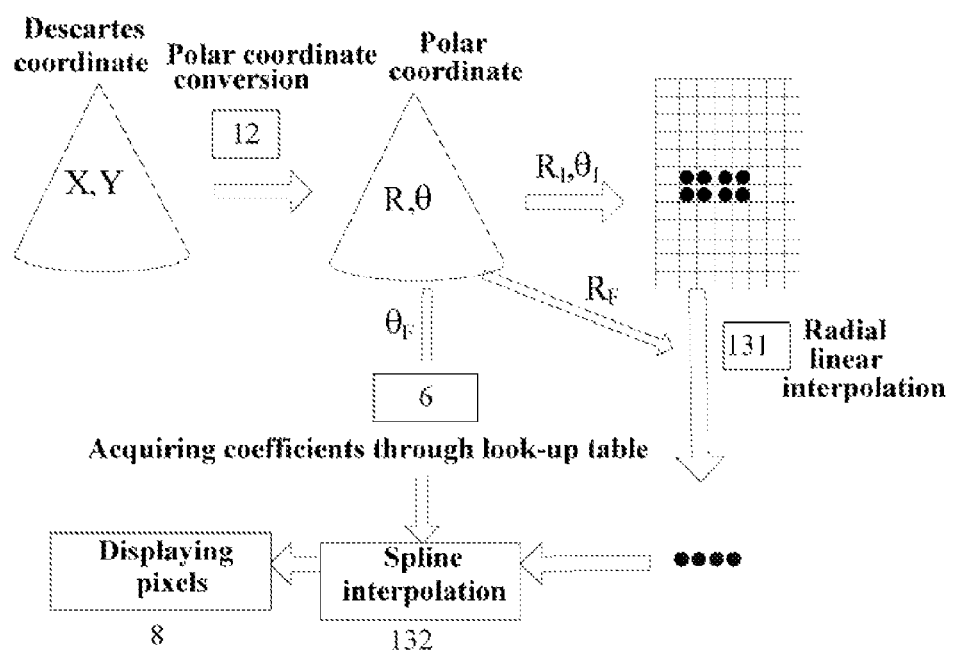
FIG. 4 is a schematic structural diagram of a scan conversion apparatus for ultrasonic imaging according to one embodiment of the disclosure.

FIG. 4 is a schematic structural diagram of a scan conversion apparatus for ultrasonic imaging according to the present disclosure, which primarily includes a storage module (not shown), a coordinate conversion module 12, a linear interpolation module 131, a nonlinear interpolation module (a spline interpolation module) 132, etc.

The general operation process of the scan conversion apparatus according to the present disclosure will be described hereinafter. First, a display point (x, y) of the Cartesian coordinate system on the CRT or LCD screen is converted from the Cartesian coordinates into the polar coordinates (R, θ) by the coordinate conversion module 12. Then, (R, θ) is disintegrated into an integer part ($R_I$,$θ_I$) and a fraction part ($R_F$,$θ_F$) as a function of the scan line density. Eight points, proximal to (R, θ), may be searched out as a function of the integer part $(R_I, \theta_I)$. Next, the linear interpolation module 131 executes linear interpolation with the eight points in the radial coordinate axis direction to obtain data of the four points. Then, the four points are spline interpolated by the spline interpolation module 132 as a function of the fraction part $\theta_F$, wherein the coefficients of spline interpolation may be gained by looking up in the coefficient table the coefficient corresponding to $\theta_F$ (as shown in block 6). Finally, the ultrasonic information calculated by spline interpolation is displayed on the CRT or LCD screen (as shown in block 8).

Details of each step of the scan conversion method described above are addressed hereinafter. Conversion from the Cartesian coordinates to the polar coordinates is relatively simple. Supposing that the coordinate of a display point in the Cartesian coordinate system is (x, y), conversion of it into the polar coordinates may be expressed as:

$$R = \sqrt{x^2 + y^2}$$
$$\theta = \arctan\frac{y}{x}$$

wherein (R, θ) indicates the position in the polar coordinates after conversion.

The position of the polar coordinates is generally not in superposition with that of the real scan imaging line. The polar coordinate (R, θ) is disintegrated into an integer part $(R_I, \theta_I)$ and a fraction part $(R_F, \theta_F)$ as a function of the scan line density, wherein in the integer part RI corresponds to the line number of the scanning line and $\theta_I$ to the sampling point in the scan depth along the scanning line. As described above, DSC contains a storage unit, which is virtual memory used for storing ultrasonic echo data. As shown in FIG. 3, the storing format of the memory usually employs binary storing corresponding to sampling in the system during practical ultrasonic imaging, with one direction along the line numbers of the scanning line and the other along the depth of the scanning line. Using the integer part $(R_I, \theta_I)$, ultrasonic echo data corresponding to the eight neighboring position points may be searched for in memory, and, using the ultrasonic echo data of the eight neighboring position points, the ultrasonic echo data corresponding to the position of (R, θ) can be returned via interpolation calculation. During interpolation, the coefficients are related to the fraction part $(R_F, \theta_F)$, a normalized fraction part. Specifically, the distance between the depth of two adjacent points is normalized as 1, and the intersection angle between two adjacent scanning lines is also normalized as 1.

Figure 5:
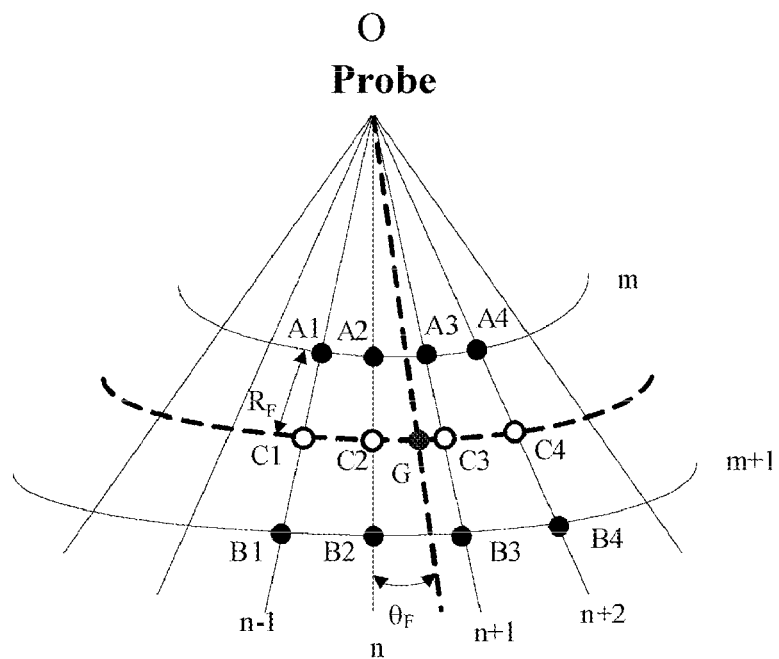
FIG. 5 is a schematic diagram illustrating spline interpolation between eight adjacent points used in the disclosed scan conversion method.

As shown in FIG. 5, Point O indicates the position of the probe. One can suppose that the eight positions obtained are A1, A2, A3, A4, B1, B2, B3, B4, respectively, wherein A1, A2, A3, and A4 are in the same depth marked as m, and B1, B2, B3, and B4 are in the same depth marked as m+1. A1 shares with B1 the same line number of the scanning line, as do A2 and B2, A3 and B3, A4 and B4, supposing that the line numbers of the scanning lines corresponding thereto are n−1, n, n+1, and n+2, respectively. The ultrasonic echo information corresponding to the eight points is designated as $X_{A1}$, $X_{A2}$, $X_{A3}$, $X_{A4}$, $X_{B1}$, $X_{B2}$, $X_{B3}$, $X_{B4}$, respectively. Then, the ultrasonic echo data of position G corresponding to the fraction part $(R_F, \theta_F)$ is calculated by executing 2-point linear interpolation as a function of the fraction part $R_F$ first, and followed by 4-point spline interpolation as a function of the fraction part $\theta_F$.

As the sampling ratio of ultrasonic echo data is relatively high along Axis R of the polar coordinates, the resulting noise from 2-point linear interpolation using the fraction part $R_F$ is very low; such simple linear interpolation, however, returns a comparatively small calculated amount. As shown in FIG. 5, it is supposed that position points C1, C2, C3, and C4 are in the same depth. Position points A1 and C1 share the same line number of the scanning line, as do A2 and C2, A3 and C3, A4 and C4. The distance in the Axis R direction from position point C1 to A1 is indicated as $R_F$. The ultrasonic echo data corresponding to the position points C1, C2, C3, and C4 are set as $X_{C1}$, $X_{C2}$, $X_{C3}$, and $X_{C4}$, respectively. Then $$X_{Ci}=X_{Ai}*(1-R_F)+X_{Bi}*R_F \quad i=1,2,3,4$$

Because the sampling ratio of the ultrasonic echo data is relatively low along Axis θ of the polar coordinates, and ordinarily the display pixels on the display system are presented in Cartesian coordinates, then, when the image is in the near field, there are more sampling points of data, and oversampling occurs; when it is in the far field, undersampling occurs. Therefore, 4-point spline interpolation is used when interpolating as a function of the fraction part $\theta_F$. If simple linear interpolation is used, characteristics of the filter will vary greatly due to different positions and ultrasonic echo data. Thus, the frequency spectrum of the image after interpolation may be changed, and such changes are not uniform in the whole image, readily resulting in texture noise therein. Use of 4-point spline interpolation can make the effects of a low-pass filter corresponding to the interpolation coefficients all the same along Axis θ of the polar coordinates. Supposing that the ultrasonic echo data corresponding to the position G is $X_G$, then $$X_G = \sum_{i=1}^{4} \omega_i X_{Ci}$$

wherein $\omega_i$ is a filter factor. This set of filter factors is related to the fraction part $\theta_F$, and could be worked out through table look-up, as shown in FIG. 4, or through real-time calculation in the practical system.

The linear interpolation algorithm concerns interpolation between two adjacent points. The present disclosure applies the method of interpolation between four adjacent points. The interpolation coefficients may be with cubic B-spline function, which are centrally symmetric and used for processing the two closest adjacent points in the positive and negative directions, respectively. This is a relatively good low-pass filter. Because B-spline functions are centrally symmetric, only description of the processing in the positive direction is required, with the range defined from 0 to 2. The fraction part $\theta_F$ ranges from 0 to 1. The two interpolation coefficients $f(\theta_F)$ and $f(1+\theta_F)$ need to be determined; respectively, the two corresponding negative coefficients are $f(1-\theta_F)$ and $f(2-\theta_F)$. The cubic spline interpolation coefficients are defined below:

$$f(\theta_F)=a_{30}\theta_F^3+a_{20}\theta_F^2+a_{10}\theta_F+a_{00} \quad 0<\theta_F<1$$

$$f(1+\theta_F)=a_{31}(1+\theta_F)^3+a_{21}(1+\theta_F)^2+a_{11}(1+\theta_F)+a_{01} \quad 1<1+\theta_F<2$$

When the interpolation coefficients are calculated, the functions above need limiting conditions. If the interpolation point is just in superposition with source data, i.e., $\theta_F$ is equal to 0, the calculated result via interpolation is required to be source data. In other words, when $\theta_F$ is equal to zero, $f(0)$ is required to be equal to 1; and when x is equal to 1 or 2, $f(1)$ is required to be equal to 0 and $f(2)$ equal to 0. According to the definition of continuity, interpolation functions should be continuous at position points 0 and 1; the first derivative should be 0 at position points 0 and 2, and continuous at position point 1. In all, there are seven limiting conditions mentioned above, and cubic spline interpolation functions have eight variants. According to the above-limiting conditions, only one variant a needs to be defined as below:

$$f(\theta_F) = a\theta_F^3 - 5a\theta_F^2 + 8a\theta F - 4a$$

$$f(\theta_F) - (a+2)\theta_F^3 - (a+3)\theta_F^2 + 1 \quad 0 < \theta_F < 1$$

$$f(1+\theta_F) = a(1+\theta_F)^3 - 5a(1+\theta_F)^2 + 8a(1+\theta_F) - 4a \quad 1 < 1 + \theta_F < 2$$

Based on cubic spline interpolation, summation of the four filter coefficients $f(1+\theta_F)$, $f(\theta_F)$, $f(1-\theta_F)$ and $f(2-\theta_F)$ should be 1. Therefore, in any case, interpolation functions do not influence the signals to be lengthened or shortened.

Figure 6:
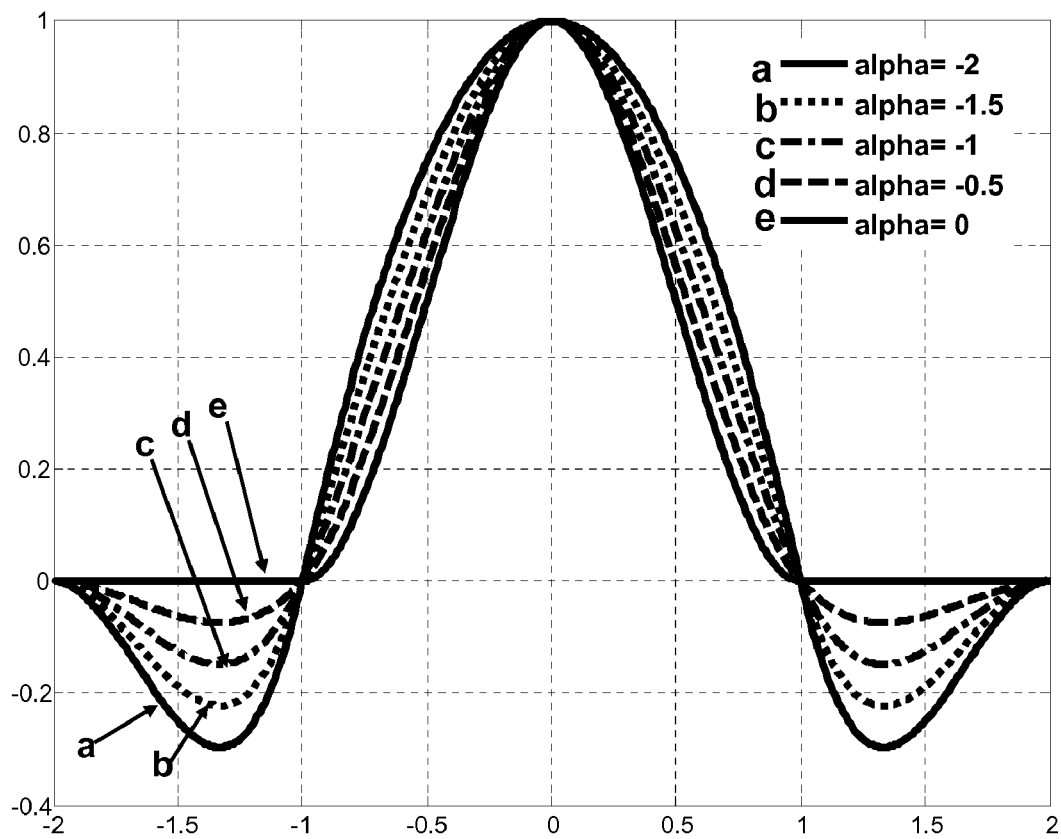
FIG. 6 is a schematic diagram of the filter factors of cubic spline interpolation according to one embodiment of the disclosure.

FIG. 6 shows variation of the interpolation filter coefficients when variant a is different, in which the abscissa reflects the changes of $\theta_F$ (i.e., the fraction part $\theta_F$ as well as $1+\theta_F$, $1-\theta_F$, $2-\theta_F$), and the ordinate reflects values of the interpolation filter coefficients. When α is negative, the function $f(x)$ is a positive number in the range of 0 to 1, but a negative one in the range of 1 to 2. When a is increased, the side lobe between 1 and 2 is increased. Such an effect is similar to a sine function after windowing. The sine function is an ideal interpolation low-pass filter, which corresponds to an ideal-window function in the frequency domain. As variant α is selected differently, filter effects could be different. As shown in FIG. 6, α might as well be selected to be equal to $-1$, and if $\theta_F$ is equal to 0.5, then $$f(0.5) = (-1+2)*0.5^3 - (-1+3)*0.5^2 + 1 = 0.625$$

$$f(1.5) = -1*1.5^3 - 5*(-1)*1.5^2 + 8*(-1)*0.5 - 4*(-1) = -0.125$$

Figure 7:
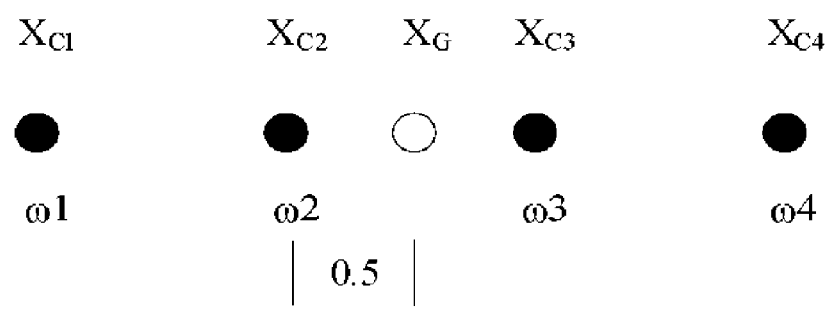
FIG. 7 depicts one specific value of the filter coefficients, wherein $\theta_F$ is equal to 0.5.

When $\theta_F$ is equal to 0.5, as shown in FIG. 7, the four interpolation filter coefficients are $f(1.5)$, $f(0.5)$, $f(0.5)$ and $f(1.5)$ respectively. That is to say, $\omega_1 = \omega_4 = -0.125$, $\omega_2 = \omega_3 = 0.625$. Then, the ultrasonic echo data at the interpolation point G is calculated as $$X_G = -0.125*X_{C1} + 0.625*X_{C2} + 0.625*X_{C3} - 0.125*X_{C4}$$

The ultrasonic echo data after interpolation may be displayed directly on the CRT or LCD screen.

During interpolation with DSC in ultrasonic imaging systems, along Axis θ of the polar coordinates, the present disclosure calculates ultrasonic echo data using 4-point interpolation. Meanwhile, a low-pass filter is employed in the interpolation coefficient algorithm during interpolation between the four points. Characteristics of a low-pass filter corresponding to the interpolation coefficients are the same along Axis θ of the polar coordinates, and the interpolation coefficients along Axis θ of the polar coordinates are equivalent to low-pass filters of the source image. Design of the interpolation coefficients may be calculated with a cubic B-spline function.

Regarding the method of linear interpolation between four adjacent points, the present disclosure uses a 4-point interpolation method rather than a 2-point linear interpolation during interpolation along Axis θ of the polar coordinates. The characteristics of the filter through linear interpolation are related to the positions of interpolation points and ultrasonic echo signals per se. In the ultrasonic images, the characteristics of the filter at various points differ greatly from one another. The interpolation coefficient algorithm during 4-point interpolation is with a cubic B-spline function. The low-pass filter effects of such a filter are similar to a sine function after windowing. This interpolation function has relatively good characteristics of low-pass filters in the space. Use of the interpolation algorithm of the present disclosure would reduce the noise caused by interpolation in ultrasonic images.

Regarding the interpolation method described in U.S. Pat. No. 5,513,120, entitled "Special Interpolation Filters," the present disclosure takes into consideration the features of ultrasonic images, i.e., the impact of coordinate conversion on the interpolation method. However, this technique is only used for interpolation and filters in common image processing. The ultrasonic source image is generally presented in the polar coordinates, and the display pixels on the display system generally in Cartesian coordinates. Along Axis R of the polar coordinates, the sampling ratio of the source image is relatively high and no noise is increased when the calculated amount is reduced because simple linear interpolation is used in the present disclosure. To the contrary, along Axis θ of the polar coordinate, the sampling ratio of the source image is relatively low, and the present disclosure uses a 4-point interpolation filter based on cubic spline functions. The interpolation coefficients during 4-point interpolation present relatively even low-pass filters in the space, such that the noise resulting from interpolation may be lessened in ultrasonic images.

The disclosed method and apparatus have proven to be effective in real-time imaging tests. Under the same conditions, the images formed by a large convex probe using DSC interpolation according to the present disclosure are clearer than those using traditional methods, which is especially obvious in the middle and far fields of the image. In addition, although the field of ultrasonic imaging in medical use is specifically disclosed herein, the present disclosure is not limited to that field. In fact, the techniques of the present disclosure may be applied to several fields that use ultrasonic imaging, such as structural flaw detection in industrial materials. Further, the method for calculating echo signals via interpolation in this disclosure has many variations. For example, if necessary, a 4-point interpolation filter may be used simultaneously along the radial coordinate axis direction (i.e., Axis R). Other nonlinear interpolation spline functions known to those skilled in the art may also be applied, not limited to cubic B-spline function. Conversion according to the present disclosure is possible in order to preinterpolate echo signal data in the polar coordinate system according to the predetermined step length and interpolation density, followed by converting the coordinates from the polar coordinate system to the Cartesian coordinate system, such that images are directly displayed in the Cartesian coordinate system based on the converted Cartesian coordinate points and corresponding preinterpolation signal data—i.e., they are not limited to conversion from a Cartesian coordinate system to a polar coordinate system.

Detailed descriptions of several example embodiments are provided above. However, the invention is not restricted to these example embodiments. Without departing from the scope of the invention, those skilled in this art may make changes and modifications, which will all fall into the claims of the invention.

Furthermore, the described features, operations, or characteristics may be combined in any suitable manner in one or more embodiments. It will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order.

Embodiments may include various steps, which may be embodied in machine-executable instructions to be executed by a general-purpose or special-purpose computer (or other electronic device). Alternatively, the steps may be performed by hardware components that include specific logic for performing the steps or by a combination of hardware, software, and/or firmware.

Embodiments may also be provided as a computer program product including a machine-readable medium having stored thereon instructions that may be used to program a computer (or other electronic device) to perform processes described herein. The machine-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic instructions.

As used herein, a software module or component may include any type of computer instruction or computer executable code located within a memory device and/or transmitted as electronic signals over a system bus or wired or wireless network. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

It will be understood by those having skill in the art that many changes may be made to the details of the above-described embodiments without departing from the underlying principles of the invention. The scope of the present invention should, therefore, be determined only by the following claims.

What is claimed is:

1. A scan conversion method for ultrasonic imaging comprising:
    a storage step for storing sample data derived from ultrasonic echo signals into a memory;
    a conversion step for performing conversion between target coordinate points in a display coordinate system and interpolation coordinate points in a sampling coordinate system; and
    an interpolation step for interpolating several sample data adjacent to the interpolation coordinate points to obtain the interpolation data at the interpolation coordinate points,
    wherein said interpolation step includes a nonlinear interpolation substep for low-pass filter of the ultrasonic echo signals.

2. The scan conversion method for ultrasonic imaging according to claim 1, characterized in that said display coordinate system is a Cartesian coordinate system, said sampling coordinate system is a polar coordinate system, said conversion step includes conversion of a coordinate point (x, y) to be displayed in the Cartesian coordinate system into an interpolation coordinate point (R, θ) in the polar coordinate system and disintegration of the interpolation coordinate point (R, θ) into a integer part ($R_I$, $\theta_I$) and a fraction part ($R_F$, $\theta_F$) as a function of the sampling density.

3. The scan conversion method for ultrasonic imaging according to claim 2, characterized in that said several sample data include eight sample data obtained through a look-up table or calculation as a function of the integer part ($R_I$, $\theta_I$), wherein said eight sample data are divided into four groups, in each of which two sampling points are located in the same radial coordinate direction (Axis R) of the polar coordinate system.

4. The scan conversion method for ultrasonic imaging according to claim 3, characterized in that said interpolation step further includes a linear interpolation substep, in which 2-point interpolation is conducted with the two sampling points in said each group along the radial coordinate axis thereof as a function of the fraction part ($R_F$) in the radial coordinate direction, thereby obtaining four intermediate interpolation signal data.

5. The scan conversion method for ultrasonic imaging according to claim 4, characterized in that said nonlinear interpolation substep interpolates said four intermediate interpolation signal data using 4-point spline interpolation as a function of the fraction part ($\theta_F$) in the polar coordinate axis to obtain the interpolation signal data corresponding to the interpolation coordinate point (R, θ), wherein the interpolation coefficient of said 4-point spline interpolation is obtained by looking up the interpolation coefficient corresponding to the fraction part ($\theta_F$) in the polar coordinate axis in an interpolation coefficient table, or by calculation in real time with cubic B-spline function, said interpolation coefficient and cubic B-spline function realizing low-pass filter of the ultrasonic echo signals.

6. A scan conversion method for ultrasonic imaging, including interpolation and coordinate conversion of sample data derived from ultrasonic echo signals, to form interpolation signal data to be displayed in the Cartesian coordinate system, said method comprising:
    converting a point (x, y) to be displayed in the Cartesian coordinate system into an interpolation point (R, θ) in the polar coordinate system, and disintegrating the interpolation point (R, θ) into an integer part ($R_I$, $\theta_I$) and a fraction part ($R_F$, $\theta_F$) as a function of a scan line density;
    obtaining eight sampling points proximal to the interpolation point (R, θ) through a look-up table or calculation as a function of the integer part ($R_I$, $\theta_I$), wherein said eight sampling points are divided into four groups, in each of which two sampling points are located in the same scanning line;
    grouping said eight sampling points and performing 2-point linear interpolation thereto as a function of the fraction part ($R_F$) along the radial coordinate axis to obtain intermediate interpolation signal data at the four points; and
    performing 4-point spline interpolation with said intermediate interpolation signal data at the four points as a function of the fraction part ($\theta_F$) along the polar coordinate axis, to obtain the interpolation signal data corresponding to the interpolation point (R, θ), wherein the interpolation coefficient of said 4-point spline interpolation is acquired by looking up the interpolation coefficient corresponding to the fraction part ($\theta_F$) along the polar coordinate axis in an interpolation coefficient table or by calculating in real time with cubic B-spline function.

7. The scan conversion method for ultrasonic imaging according to claim 6, characterized in that said interpolation coefficient table is prepared by precalculation according to a cubic B-spline function.

8. The scan conversion method for ultrasonic imaging according to claim 7, characterized in that said cubic B-spline function is $$f(\theta_F) = (a+2)\theta_F^3 - (a+3)\theta_F^2 + 1 \quad 0 < \theta_F < 1$$

$$f(1+\theta_F) = a(1+\theta_F)^3 - 5a(1+\theta_F)^2 + 8a(1+\theta_F) - 4a \quad 1 < 1+\theta_F < 2$$

wherein the interpolation coefficients of said 4-point spline interpolation to be calculated are $f(\theta_F)$, $f(1+\theta_F)$, $f(1-\theta_F)$, and $f(2-\theta_F)$, respectively, wherein $0 < \theta_F < 1$.

9. A scan conversion apparatus for ultrasonic imaging, comprising:
   a storage module for storing sample data derived from ultrasonic echo signals;
   a coordinate conversion module for performing conversion between target coordinate points in a display coordinate system and interpolation coordinate points in a sampling coordinate system; and
   an interpolation module for interpolating several sample data adjacent to the interpolation coordinate points to obtain the interpolation data at the interpolation coordinate points,
   wherein said interpolation module includes a nonlinear interpolation submodule selected for low-pass filter of said ultrasonic echo signals.

10. A scan conversion apparatus for ultrasonic imaging, including interpolation and coordinate conversion of sample data derived from ultrasonic echo signals to form interpolation signal data to be displayed in the Cartesian coordinate system, said apparatus comprising:
   a storage module for storing sample data derived from ultrasonic echo signals;
   a coordinate conversion module for converting a point (x, y) to be displayed in the Cartesian coordinate system into an interpolation point (R, θ) in the polar coordinate system, and disintegrating the interpolation point (R, θ) into an integer part ($R_I$, $\theta_I$) and a fraction part ($R_F$, $\theta_F$) as a function of scan line density;
   a linear interpolation module for obtaining the proximal eight sampling points through a look-up table or calculation as a function of the integer part ($R_I$, $\theta_I$), wherein said eight sampling points are divided into four groups, in each of which two sampling points are located in the same scanning line, and grouping said eight sampling points along the radial coordinate axis of the polar coordinate system and performing two-point linear interpolation thereon as a function of the fraction part ($R_F$) along the radial coordinate axis to obtain intermediate interpolation signal data at the four points; and
   a nonlinear interpolation module for performing 4-point spline interpolation with said intermediate interpolation signal data at the four points as a function of the fraction part ($\theta_F$) along the polar coordinate axis, to obtain the interpolation signal data corresponding to the interpolation point (R, θ), wherein the interpolation coefficient of said 4-point spline interpolation is acquired by looking up the interpolation coefficient corresponding to the fraction part ($\theta_F$) along the polar coordinate axis in an interpolation coefficient table or by calculating in real time with cubic B-spline function.

11. A non-transitory computer-readable medium comprising program code for performing a scan conversion method for ultrasonic imaging, including interpolation and coordinate conversion of sample data derived from ultrasonic echo signals, to form interpolation signal data to be displayed in the Cartesian coordinate system, said method comprising:
   converting a point (x, y) to be displayed in the Cartesian coordinate system into an interpolation point (R, θ) in the polar coordinate system, and disintegrating the interpolation point (R, θ) into an integer part ($R_I$, $\theta_I$) and a fraction part ($R_F$, $\theta_F$) as a function of a scan line density;
   obtaining eight sampling points proximal to the interpolation point (R, θ) through a look-up table or calculation as a function of the integer part ($R_I$, $\theta_I$), wherein said eight sampling points are divided into four groups, in each of which two sampling points are located in the same scanning line;
   grouping said eight sampling points and performing 2-point linear interpolation thereto as a function of the fraction part ($R_F$) along the radial coordinate axis to obtain intermediate interpolation signal data at the four points; and
   performing 4-point spline interpolation with said intermediate interpolation signal data at the four points as a function of the fraction part ($\theta_F$) along the polar coordinate axis, to obtain the interpolation signal data corresponding to the interpolation point (R, θ), wherein the interpolation coefficient of said 4-point spline interpolation is acquired by looking up the interpolation coefficient corresponding to the fraction part ($\theta_F$) along the polar coordinate axis in an interpolation coefficient table or by calculating in real time with cubic B-spline function.

12. An apparatus for ultrasonic imaging, including interpolation and coordinate conversion of sample data derived from ultrasonic echo signals, to form interpolation signal data to be displayed in the Cartesian coordinate system, said apparatus comprising:
   means for converting a point (x, y) to be displayed in the Cartesian coordinate system into an interpolation point (R, θ) in the polar coordinate system, and disintegrating the interpolation point (R, θ) into an integer part ($R_I$, $\theta_I$) and a fraction part ($R_F$, $\theta_F$) as a function of a scan line density;
   means for obtaining eight sampling points proximal to the interpolation point (R, θ) through a look-up table or calculation as a function of the integer part ($R_I$, $\theta_I$), wherein said eight sampling points are divided into four groups, in each of which two sampling points are located in the same scanning line;
   means for grouping said eight sampling points and performing 2-point linear interpolation thereto as a function of the fraction part ($R_F$) along the radial coordinate axis to obtain intermediate interpolation signal data at the four points; and means for performing 4-point spline interpolation with said intermediate interpolation signal data at the four points as a function of the fraction part ($\theta_F$) along the polar coordinate axis, to obtain the interpolation signal data corresponding to the interpolation point (R, θ), wherein the interpolation coefficient of said 4-point spline interpolation is acquired by looking up the interpolation coefficient corresponding to the fraction part ($\theta_F$) along the polar coordinate axis in an interpolation coefficient table or by calculating in real time with cubic B-spline function.

* * * * *